Patented Feb. 10, 1953

2,628,185

UNITED STATES PATENT OFFICE 2,628,185

ANALGESIC COMPOUNDS AND COMPOSITIONS

Mozes Juda Lewenstein, Kew Gardens, N. Y.

No Drawing. Application April 1, 1949, Serial No. 85,050

8 Claims. (Cl. 167—67)

This invention relates to new compounds having a narcotic effect and more particularly to new compounds of this type, in which one or more narcotic components are combined with components having antispasmodic effects. The invention also relates to processes for preparing the new compounds.

The main object of the present invention is to avoid or reduce the adverse side effects of narcotic compounds, such as morphine, codeine, their salts and derivatives, and other products having similar physiological effects, by combining such narcotic compounds and antispasmodic compounds with the use of suitable acids which are capable of neutralizing at least two equivalents of base.

Another object of my invention consists in providing compounds of the above mentioned type in which the individual narcotic and antispasmodic compounds are present in predetermined proportions.

It is also an object of my invention to provide stable compounds of the beforementioned type, which can be easily prepared in pure condition and are soluble in solvents suitable for therapeutic adminstration.

Other objects and advantages of the invention will be apparent from the following specification and the appended claims.

In carrying out the present invention, natural or synthetic compounds having narcotic effects, for example morphine, codeine, dihydrocodeinone, ethyl - 1 - methyl - 4 - phenylpiperidine - 4 - carboxylate, 6-dimethylamino - 4,4 - diphenyl-3-heptanone, dihydromorphinone, dihydrohydroxycodeinone, salts and derivatives of these compounds, and other compounds or products having similar physiological effects, and mixtures of two or more narcotics may be used. Examples of antispasmodics adapted to be used in my invention are: homatropine, diphenylacetyldiethyl - aminoethanol, beta - diethyl - aminoethyl fluorene-9-carboxylate, dl-tropic acid ester of 3 - diethylamino - 2,2 - dimethyl - 1 - propanol, methyl - amino - iso - octene, bis - gamma-phenyl-propylethyl-amine, beta-diethyl-aminoethyl phenylpropylacetate, beta-diethyl-aminoethyl phenylcyclo - hexylacetate, beta - diethyl-aminoethyl phenyl-benzylacetate, atropine and papaverine.

The above mentioned narcotics and antispasmodics are combined according to my invention by means of suitable polybasic acids such as camphoric acid, tartaric acid, succinic acid, phthalic acid, terephthalic acid, phenoldisulfonic acid, benzene trisulfonic acid, salicyl disulfonic acid, citric acid, saccharic acid, sulfuric acid, sulfurous acid, phosphoric acid and the like. By reacting these acids with the narcotic compound and antispasmodic compound to be combined, these compounds are linked to the radical of the acid, thus forming a double or polysalt-like compound of at least one narcotic and at least one antispasmodic compound of a polybasic acid. I may react these acids with molecular equivalents of different narcotics and antispasmodics. For instance, I may react 1 molecule of a dibasic acid with 1 molecule of a narcotic and 1 molecule of an antispasmodic. But my invention also provides the possibility of preparing these compounds or salts in a wide range of exactly predetermined different compositions. For instance, for 1 molecule of a dibasic acid, I may use ⅔ molecule narcotic and 1⅓ molecule antispasmodic. I also use 2 or more narcotics and/or 2 or more antispasmodics to form a salt thus giving such a scope and variance to the present invention that the most suitable composition can be made available for each different narcotic.

The reaction between the narcotic and antispasmodic compounds and the acids may be carried out in various ways. For example, each compound is dissolved separately in the most suitable solvent; then the liquids are combined and the desired product is isolated. Or the reaction components may be dissolved in a common solvent and the desired combination products isolated by evaporation or precipitation. Or the compounds according to the invention may be formed by double decomposition, for example by reacting a solution of the soluble barium salt of an acid with sulfates of the narcotic and antispasmodic compound.

The following examples illustrate some embodiments of my invention.

Example 1.—3 grams of morphine are dissolved in 75 cc. methanol. 1 gram of malonic acid is dissolved in 5 cc. ethanol. 3 grams of dl-tropic acid ester of 3-diethylamino-2,2-dimethyl-1-propanol are dissolved in 50 cc. chloroform. The liquids are mixed and the greatest part of the solvents is distilled off. The residue is then left in the ice box for 24 hours, filtered by suction, dried and powdered.

Example 2.—3.2 grams of codeine, 3.1 grams of diphenylacetyldiethylaminoethanol and 1.2 grams of fumaric acid are heated together under reflux in 125 cc. ethanol until a clear solution results. Most of the liquid is distilled off and the compound precipitated by addition of excess ether. The mixture is allowed to stand in the refrigerator for 24 hours. Then the precipitate is isolated by filtration under suction, dried and powdered.

*Example 3.*—3.15 grams of dihydrohydroxycodeinone, 2.75 grams of homatropine and 1.66 grams of terephthalic acid are suspended in 75 cc. methanol and heated under reflux until a clear solution results. The solution is then concentrated under ordinary pressure, until nearly all the methanol has been removed. The residue is left in the ice box for 24 hours, dried and ground in a mortar.

*Example 4.*—2.5 grams of ethyl-1-methyl-4-phenylpiperidine-4-carboxylate, 3 grams of beta-diethylaminoethyl fluorene-9-carboxylate and 1.5 grams of adipic acid are heated together under reflux in 300 cc. acetone until a clear solution results. The acetone is removed by distillation and the residue dried and powdered.

*Example 5.*—5 grams of dihydrocodeinone bitartrate and 1.4 grams of methyl-iso-octenylamine are heated together under reflux in 400 cc. isopropyl alcohol until a clear solution results. The isopropyl alcohol is removed and the residue dried and ground.

*Example 6.*—2.5 grams of barium succinate, 3.6 grams of 6-dimethylamino-4,4-diphenyl-3-heptanone sulfate and 3.3 grams of bis-gamma-phenyl-propylethylamine sulfate are heated under reflux in 500 cc. dioxane. The precipitate is removed by filtration with suction and the filtrate is concentrated in vacuo to a small volume. The residue is left in the ice box for 24 hours, dried and ground.

*Example 7.*—2.1 grams of citric acid, 5.7 grams of dihydromorphinone and 2.75 grams of homatropine are suspended in 400 cc. methanol and heated under reflux until a clear solution results. Then the methanol is distilled off and the residue cooled, dried and powdered.

*Example 8.*—3.1 grams of ethylmorphine, 1.75 grams of equisetic acid, 5.7 grams of atropine are dissolved in 60 cc. ethanol. The solution is filtered and the ethanol evaporated. The residue is dried and powdered.

*Example 9.*—3 grams of dihydrocodeine, 3.4 grams of papaverin, 1.48 grams of phthalic anhydride are suspended in 500 cc. water and refluxed until the solids have dissolved. The solution is then concentrated at reduced pressure to a small volume and further concentrated at ordinary pressure. The residue is then dried and powdered.

Quite unexpectedly it has been found that the required quantities of the antispasmodics are much smaller than was to be anticipated and much less than the doses of these drugs which are usually recommended for therapeutic purposes. Apparently minute quantities of the antispasmodics, when present in the form according to this invention, are sufficient to prevent some of the undesirable side effects of narcotics, like nausea and vomiting. In addition, the action of the antispasmodics when administered in the form of these combined salts, appears to be more uniform and more energetic. In order to provide for good tolerance by patients of a whole narcotic dose, it has in some cases been found sufficient to convert not more than approximately 10% of the therapeutic doses of some of the usual narcotic salts into polybasic salts according to my invention.

For instance, if a dose of 10 mgm. dihydrocodeinone bitartrate is to be taken and 1 mgm. of this dose is converted into the form of the neutral salt, as described in Example 5, the whole dose will be well tolerated even by many such patients who otherwise react with nausea and vomiting to 10 mgm. dihydrocodeinone bitartrate. Or, if 1 mgm. of a neutral salt, prepared as per Example 1, is added to 9 mgm. morphine sulfate, the total dose will usually produce less side effects than 10 mgm. morphine sulfate administered alone.

Therefore, narcotics when they are converted into, or are used in mixture with the compounds of this invention, are better tolerated without their therapeutic effectiveness being reduced. As shown by tests, the compounds obtained according to the invention possess distinctly improved effects in comparison with the use of the narcotics alone, and in comparison with known narcotic compositions containing various admixtures. The presence of one or more antispasmodics linked to a narcotic according to my invention, results in a reduction or prevention of some of the known adverse side effects of narcotics.

Another unexpected feature of my invention consists in the reduced addiction liabilities of the compounds. Whilst withdrawal symptoms and habituation effects are noticed with most narcotics, such symptoms and effects are apparently substantially minimized when my invention is applied. So far neither signs of addiction nor of withdrawal symptoms have been reported when narcotics were administered according to this invention, although the investigators have been asked specifically to report any such effects. The synergistic action of a narcotic and an antispasmodic administered simultaneously in the form of these neutral salts apparently does not favor habituation.

The products embodying my invention may be used in the form of tablets, capsules, solutions and suppositories and they may be administered by injection, per os or into the rectum.

In preparing the tablets, solutions and the like, accompanying ingredients, such as binders, diluents, lubricating agents, stabilizers, and the like may be used. For example, tablets of the composition corresponding to the above Example 3 may be prepared from the following ingredients:

45 grams dihydrohydroxycodeinone hydrochloride
5 grams dihydrohydroxycodeinone homatropine terephthalate

| | |
|---|---|
| Milk sugar | 2 lbs. 10 ozs. |
| Starch | 6 ozs. |
| Corn dextrine | 5 ozs. |
| Butlers grape shade | 2½ grs. |
| Water, Q. S. | | granulated with methanol. Add to dry granulation

| | |
|---|---|
| Talc | 8 ozs. |
| Starch | 8 ozs. |

From the above components approximately 10,000 tablets, each containing 4¼ mg. dihydrohydroxycodeinone hydrochloride and ½ mg. dihydrohydroxycodeinone homatropine terephthalate may be obtained by tabletting; each tablet to weigh 2.63 gr. The products described in the other examples and other products embodying my invention may be converted into tablets in a substantially similar manner.

In order to prepare an injectable solution of the product described in Example 5: 46 grams dihydrocodeinone hydrochloride and 4 grams dihydrocodeinone methyliso-octenylamine tartrate are dissolved in approximately 10,000 cc. of distilled water and approximately 1,000 vials each of 10 cc. are filled.

My invention is not limited to the specific ingredients, proportions, process steps, solvents and other specific details described above. For example, other narcotics and other antispasmodics and other acids than those described above may be used, and the ingredients may be reacted in other proportions and may be obtained by other procedures than those disclosed above.

It is to be understood that the term "narcotic compound" is used in the present specification and claims to denote any natural or synthetic compounds having narcotic effects, particularly the narcotic compounds specifically mentioned above, while the term "antispasmodic compound" is used to denote any antispasmodic compounds with either musculotropic or neurotropic effect or both, particularly the antispasmodics specifically mentioned above. The term "opium alkaloid" is used in the present specification and claims to include alkaloids occurring in opium, and derivatives or substitution products obtainable from said alkaloids and having a narcotic effect. The term "polybasic acid" is used in the present specification and claims to denote acids having more than one hydrogen atom replaceable by a base.

While my invention has been described in connection with certain preferred embodiments of the same it is not limited to the specific details disclosed and may be carried out with various additions, substitutions, and modifications, without departing from the scope of the invention as defined in the appended claims.

What I claim is:

1. A new pharmaceutical product comprising a double salt of a polybasic acid with homatropine and at least one narcotic compound selected from the group consisting of dihydrohydroxycodeinone, dihydrocodeinone, dihydromorphinone, ethyl-1-methyl-4-phenylpiperidine-4-carboxylate and 6-dimethyl-amino-4,4-diphenyl-3-heptanone in mixture with at least one simple salt of said narcotic compounds.

2. A new pharmaceutical product comprising as active ingredients a mixture of about 90% by weight of dihydrohydroxycodeinone hydrochloride and about 10% by weight of dihydrohydroxycodeinone homatropine terephthalate.

3. A new pharmaceutical product as claimed in claim 1, in which said double salt is present in an amount of at least 10% by weight, based on the sum of the weight of said double salt and simple salt.

4. A new pharmaceutical product consisting of the double salt of an organic polybasic acid with homatropine and dihydrohydroxycodeinone.

5. A new pharmaceutical product consisting of the double salt of an organic polybasic acid with homatropine and dihydrocodeinone.

6. A new pharmaceutical product consisting of the double salt of an organic polybasic acid with homatropine and dihydromorphinone.

7. A new pharmaceutical product consisting of the double salt of an organic polybasic acid with homatropine and ethyl-1-methyl-4-phenyl-piperidine-4-carboxylate.

8. A new pharmaceutical product consisting of the double salt of an organic polybasic acid with homatropine and 6-dimethylamino-4,4-diphenyl-3-heptanone.

MOZES JUDA LEWENSTEIN.

REFERENCES CITED

The following references are of record in the file of this patent:

UNITED STATES PATENTS

| Number | Name | Date |
| --- | --- | --- |
| 1,061,139 | Straub | May 6, 1913 |
| 1,656,784 | Fischer | Jan. 17, 1928 |
| 2,027,722 | Diehl | Jan. 14, 1936 |
| 2,491,741 | Ledrut | Dec. 20, 1949 |

FOREIGN PATENTS

| Number | Country | Date |
| --- | --- | --- |
| 117,203 | Austria | Nov. 15, 1929 |
| 437,923 | Germany | Dec. 2, 1926 |

OTHER REFERENCES

Hager's Handbuch der Pharmazent's Praxis, Berlin, page 351, J. Springer 1927, volume I.

Goodman et al.: Pharmacological Basis of Therapeutics, MacMillan, pages 209, 337, 462, 477 to 480, New York, 1941.

Sollman: A Manual of Pharmacology, 4th edition, Philadelphia, W. B. Saunders Company, 1932, page 398.